Figure 1:
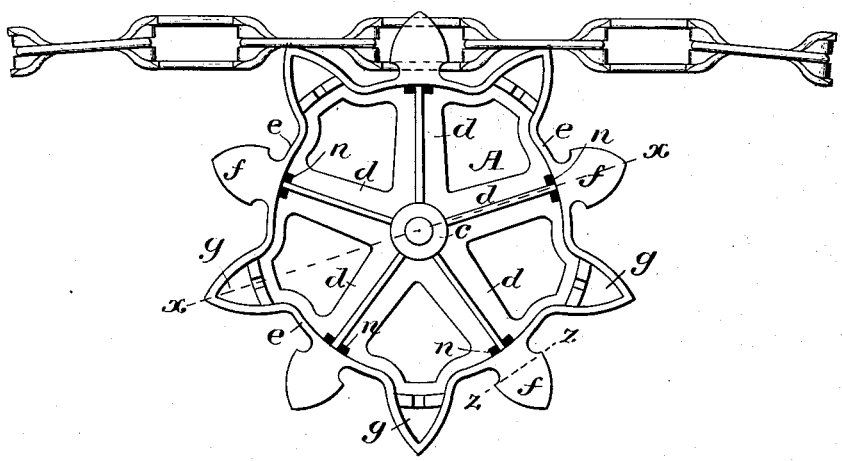

(No Model.)

J. M. DODGE.
CHAIN WHEEL.

No. 355,513. Patented Jan. 4, 1887.

ATTEST—
J. Henry Kaiser
Harry L. Amer

INVENTOR—
James M. Dodge
By J. N. McIntire
Attorney.

UNITED STATES PATENT OFFICE.

JAMES M. DODGE, OF PHILADELPHIA, PENNSYLVANIA, ASSIGNOR TO THE EWART MANUFACTURING COMPANY, OF CHICAGO, ILLINOIS.

CHAIN-WHEEL.

SPECIFICATION forming part of Letters Patent No. 355,513, dated January 4, 1887.

Application filed October 4, 1886. Serial No. 215,297. (No model.)

*To all whom it may concern:*

Be it known that I, JAMES M. DODGE, of Philadelphia, in the county of Philadelphia and State of Pennsylvania, have invented a new and useful Improvement in Chain-Wheels; and I do hereby declare that the following is a full, clear, and exact description thereof, reference being had to the accompanying drawings, making part of this application.

My invention relates to chain-wheels or sprocket-wheels, and particularly to that species of chain-wheel in which, for the purpose of being used in conjunction with drive or carrier chains of the cable class or type, some of the engaging teeth or sprockets of the wheel are adapted to laterally embrace links which rest in the spaces between the parts of such duplex teeth, and upon a seat or saddle-like support formed on or at the rim or periphery of the wheel. Such a species of chain-wheel is shown and described in another application filed by me and now pending in the United States Patent Office, and in the use of such wheels, especially where they are used in connection with carrier or conveyer chains and devices, there is more or less liability of collection of dirt or particles of the material being conveyed on the saddle-like seats or bearing portions of the duplex sprocket devices. Any such collection of dirt is liable to eventually cause the chain to be displaced or run out of gear with the wheel, and it is to overcome this difficulty in the species of chain-wheel mentioned that I have devised the invention made the subject of my present application.

Said invention may be said to consist, essentially, in forming or providing the seat or saddle-like portion or rim of such chain-wheels, at the vicinity of the duplex teeth, with apertures in the rim, which extend clear through the same in the direction of the center of the wheel, through which any collection of dirt or other matter from the links of the carrier or conveyer chain will fall or pass through said openings, instead of collecting on the bearing-surface of the rim, and finally partially destroying the efficiency of the chain-carrying device.

To enable those skilled in the art to which my invention relates to make and use chain-wheels embracing my improvement, I will now proceed to more fully describe the latter, referring by letters of reference to the accompanying drawings, which form a part of this specification, and in which I have shown my said invention carried out in that form which is the best now known to me, and in which I have, so far, successfully practiced it.

Figure 2:
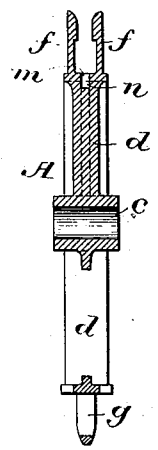
Figure 3:
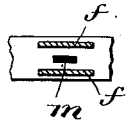

In the drawings, Figure 1 is a side view of one of my improved chain-wheels, showing in connection therewith a section of chain adapted to engage with the sprockets. Fig. 2 is a section of the same at the line $x\,x$ of Fig. 1. Fig. 3 is a detail section of one of the duplex or double teeth taken at the line $z\,z$ of Fig. 1.

In the several figures the same part will be found designated by the same letter of reference.

The wheel A is composed, preferably, of integral cast arms $d$, a central or hub-like portion, $c$, a rim, $e$, and alternately-arranged single and duplex teeth or sprocket devices $f$ and $g$.

The general construction and designed mode of operation of a wheel thus provided with alternately-arranged teeth of different constructions need not be particularly described here, as it will be found fully explained in another application now pending by me, in which this peculiar construction of wheel constitutes the subject-matter of alleged invention.

The invention in this case relates, as heretofore stated, to a means for preventing the collection of dirt or other matter on the rim or seat-like portion of the wheel, at the locality of the duplex teeth $f$, which accumulation of dirt is liable to cause the chain to work badly on the wheel, or to jump or run out of mesh with its sprockets. The means provided for overcoming this difficulty consists simply in a perforation, $m$, (see Fig. 3,) in the rim or periphery $e$ of the wheel, and between the cheek-pieces or separate parts of the duplex sprocket devices $f$, which holes or perforations pass entirely through the rim $e$, and extend partially down into the main body portions of the arms $d$ of the wheel, as shown by the darkly-shaded portions $n$ at Fig. 1. These openings or holes, it will be seen, form a complete passage-way for the ready escape downwardly (or radially of the wheel) of any dust or particles of dirt or other substance which might otherwise be deposited from the links of a carrier-chain onto the bearing-surfaces or the cheek-pieces $f$, and there accumulate, so as to eventually clog or impair the proper action of the wheel and chain. Of course the size and shape of these apertures may be varied within the judgment of the skilled constructer, the essential feature being that they shall pass through the rim and afford, as shown and described, a passage-way for the free escape of any such dirt or other substance.

Having now so fully explained the nature and operation of my improvement that those skilled in the art can make and use my invention shown in this application, and the form of wheel shown embracing the arrangement of alternate single and double teeth, which construction of wheel is made the subject of another application now pending in the Office and numbered 215,296, what I claim herein as new, and desire to secure by Letters Patent, is—

A sprocket-wheel having alternately-arranged single and duplex teeth to act, respectively, upon the links of a cable-chain, which are arranged alternately in different planes and formed with holes or apertures $m$, located between the cheek pieces or parts of the duplex teeth, all substantially in the manner and for the purposes hereinbefore specified.

In witness whereof I have hereunto set my hand this 28th day of July, 1886.

JAMES M. DODGE.

In presence of—
  D. S. GARWOOD,
  C. A. FRY.